United States Patent
Boehlke et al.

(10) Patent No.: US 10,602,468 B2
(45) Date of Patent: Mar. 24, 2020

(54) SOFTWARE BASED AUDIO TIMING AND SYNCHRONIZATION

(71) Applicant: Summit Wireless Technologies, Inc., Beaverton, OR (US)

(72) Inventors: Kenneth A. Boehlke, Portland, OR (US); Harold T. Davis, Hillsboro, OR (US)

(73) Assignee: Summit Wireless Technologies, Inc., Beaverton, OR (US)

( * ) Notice: Subject to any disclaimer, the term of this patent is extended or adjusted under 35 U.S.C. 154(b) by 0 days.

(21) Appl. No.: 16/375,392

(22) Filed: Apr. 4, 2019

(65) Prior Publication Data

US 2019/0297589 A1 Sep. 26, 2019

Related U.S. Application Data

(63) Continuation-in-part of application No. 15/863,637, filed on Jan. 5, 2018, which is a continuation-in-part of application No. 15/660,800, filed on Jul. 26, 2017, now abandoned, which is a continuation of application No. 14/186,852, filed on Feb. 21, 2014, now Pat. No. 9,723,580.

(51) Int. Cl.
| | |
|---|---|
| *H04W 56/00* | (2009.01) |
| *H04N 21/4363* | (2011.01) |
| *H04J 3/06* | (2006.01) |
| *H04N 21/43* | (2011.01) |
| *H04R 5/04* | (2006.01) |

(52) U.S. Cl.
CPC ......... *H04W 56/001* (2013.01); *H04J 3/0664* (2013.01); *H04N 21/4307* (2013.01); *H04N 21/43637* (2013.01); *H04R 5/04* (2013.01); *H04R 2420/07* (2013.01)

(58) Field of Classification Search
CPC ... H04W 56/001; H04R 5/04; H04R 2420/07; H04R 27/00; H04R 2227/003; H04N 21/4307; H04N 21/43637; H04J 3/0664
See application file for complete search history.

(56) References Cited

U.S. PATENT DOCUMENTS

| | | | |
|---|---|---|---|
| 4,953,117 A | 8/1990 | Lagadec | |
| 6,269,122 B1* | 7/2001 | Prasad | H04N 5/04 348/425.4 |
| 7,103,072 B1* | 9/2006 | Sloan | H04J 3/0685 370/503 |
| 8,340,672 B2 | 12/2012 | Brown et al. | |
| 8,965,942 B1* | 2/2015 | Rossum | H03K 5/26 341/61 |

(Continued)

OTHER PUBLICATIONS

Boatright, "Understanding IEEE's deterministic AV bridging standards," http://staging.embedded.com/print/4008284, May 20, 2009, 9 pgs.

(Continued)

*Primary Examiner* — Jay P Patel
(74) *Attorney, Agent, or Firm* — Chernoff Vilhauer LLP

(57) ABSTRACT

Synchronization of plural outputs of data transported by a wireless network is facilitated by band limiting a sample clock signal controlling a rate at which data is processed by the network's devices and/or band limiting wall time data controlling the real time for presenting a datum.

29 Claims, 11 Drawing Sheets

(56) References Cited

U.S. PATENT DOCUMENTS

| | | | |
|---|---|---|---|
| 2003/0016770 A1* | 1/2003 | Trans | H04B 1/00 375/346 |
| 2003/0235216 A1 | 12/2003 | Gustin | |
| 2004/0228367 A1 | 11/2004 | Mosig | |
| 2007/0030986 A1* | 2/2007 | McArthur | H04H 20/28 381/311 |
| 2009/0135854 A1 | 5/2009 | Bettin et al. | |
| 2010/0189109 A1 | 7/2010 | Nakajima et al. | |
| 2011/0216660 A1 | 9/2011 | Lee et al. | |
| 2014/0043177 A1* | 2/2014 | Pagnanelli | H03M 3/30 341/143 |
| 2014/0118473 A1* | 5/2014 | Halavy | H04N 7/152 348/14.09 |
| 2014/0168277 A1* | 6/2014 | Ashley | G06F 3/1446 345/672 |
| 2014/0228367 A1* | 8/2014 | Flynn | C07D 403/12 514/248 |
| 2015/0052571 A1* | 2/2015 | Stokking | H04N 21/242 725/116 |
| 2015/0171890 A1* | 6/2015 | Pagnanelli | H03M 3/468 341/143 |

OTHER PUBLICATIONS

Den Hollander et al., "IEEE 802.1AS Timing and Synchronization and its applications," The 4th International Telecoms Synchronization Forum, Nov. 15-16, 2006, Gaithersburg, MD, 44 pgs.

International Search Report and Written Opinion, dated May 22, 2015, PCT International App. No. PCT/US2015/016400, Summit Semiconductor, LLC, 8 pgs.

Steigmann, Richard et al., "Introduction to WISA: WISA—Wireless Interface for Sensors and Actuators," ABB White Japer, V2.0, Jul. 2006, 16 pages.

Henzler, "High-Speed Digital CMOS Circuits," Technische Universtat Munchen, found at http://www.lte.ei.tum.de/lehre/EDHCS/2011/handouts/PhaseLockedLoops_compact.pdf; Summer Term 2011, 2 pages.

Extended European Search Report prepared by the European Patent Office for EP15751788.9, dated Aug. 4, 2017, 10 Sages.

* cited by examiner

SOFTWARE BASED AUDIO TIMING AND SYNCHRONIZATION

CROSS-REFERENCES TO RELATED APPLICATIONS

This application is a continuation in part of U.S. Ser. No. 15/863,637 which is a continuation-in-part of U.S. Ser. No. 15/660,800, which is a continuation of U.S. patent application Ser. No. 14/186,852, filed Feb. 21, 2014, now issued as U.S. Pat. No. 9,723,580 "Synchronization Of Audio Channel Timing".

BACKGROUND OF THE INVENTION

In U.S. patent application Ser. No. 14/186,852, a hardware methodology for recovering and filtering audio timing was presented. The key circuit element in this approach, which is not available on most generic processor SOCs, was a low bandwidth Phase lock Loop (PLL). This PLL was used twice; to filter the beacon based Time Synchronization function (TSF) value and to generate the output audio clock.

For a soft implementation as taught and claimed herein, these two PLL hardware functions are converted to an Estimator 308 and a Sample Rate Converter (SRC) code 310. The present invention again relates to wireless data networks and, more particularly, to a system and method for synchronizing outputs at multiple endpoints in a network which includes a wireless communication link.

While audio and video equipment has historically been connected by analog or digital point-to-point, one-way connections, an increasing portion of multimedia content is distributed over networks. For example, video and uncompressed audio may be streamed from an audio/video source in a media room or closet to a display and multiple speakers of a surround sound system in a remote room or rooms in a residence. Since it is difficult to retrofit finished structures with cabling, in many cases data, including video and audio data, is transmitted from a source to a display, speakers or other output devices over a network that includes a wireless communication link(s) utilizing low cost radio technologies such as frequency modulation and spread spectrum modulation to transport packetized digital data.

Synchronization of outputs and minimization of system latency are critical requirements for high quality audio whether or not combined with video. The human ear is sensitive to phase delay or channel-to-channel latency and multi-channel audio output with channel-to-channel latency greater than 50 microsecond (µs) is commonly described as disjointed or blurry sound. On the other hand, source-to-output delay or latency ("lip-sync") greater than 50 milliseconds (ms) is commonly considered to be noticeable in audio-video systems. In a digital network, such as an audio/video system, a source of digital data transmits a stream of data packets to the network's end points where the data is presented. Typically, a pair of clocks at each node of the network controls the time at which a particular datum is presented and the rate at which data is processed, for examples, an analog signal is digitized or digital data is converted to an analog signal for presentation. The actual or real time that an activity, such as presentation of a video datum, is to occur is determined by "wall time," the output of a "wall clock" at the node. A sample or media clock controls the rate at which data is processed, for example, the rate at which blocks of digital audio data introduced to a digital to analog converter.

Audio video bridging (AVB) is the common name of a set of technical standards developed by the Institute of Electrical and Electronics Engineers (IEEE) and providing specifications directed to time-synchronized, low latency, streaming services over networks. The Precision Time Protocol (PTP) specified by "IEEE Standard for a Precision Clock Synchronization Protocol for Networked Measurement and Control Systems," IEEE Std. 1588-2008 and adopted in IEEE 802.1AS-2011—"IEEE Standard for Local and Metropolitan Area Networks—Timing and Synchronization for Time-Sensitive Applications in Bridged Local Area Networks" describes a system enabling distributed wall clocks to be synchronized within 1 µs over seven network hops.

A master clock to which the remaining distributed clocks, the slave clocks, are to be synchronized is selected either by a "best master clock" algorithm or manually. Periodically, the device comprising the master clock (the "master device") and the device(s) comprising the slave clock(s) (the "slave device(s)") exchange messages which include timestamps indicating the master clock's "wall time" when the respective message was either transmitted or received by the master device. The slave device notes the local wall times when the respective messages were received or transmitted by it and calculates the offset of the slave clock relative to the master clock and the network delay, the time required for the messages to traverse the network from the master device to the slave device. With repeated measurements, the frequency drift of the slave clock relative to the master clock can also be determined enabling the slave clock to be synchronized with the master clock by adjusting the slave clock's wall time for the offset and the network delay and adjusting the slave clock's frequency for any frequency drift relative to the master clock.

PTP can synchronize wall clocks of an extensive network or even plural networks, but the accuracy of PTP can be strongly influenced by the loading and exposure to interference of the wireless communication link(s). An alternative to PTP for synchronizing the wall time at plural devices of a wireless network is the Time Synchronization Function (TSF) specified in IEEE 802.11, "IEEE Standard for Information Technology—Telecommunications and Information Exchange Between Systems Local and Metropolitan Area Networks." Every 802.11 compliant device in a network known as a basic service set (BSS) includes a TSF counter. Periodically, during a beacon interval, devices of the BSS transmit a beacon frame containing a timestamp indicating the local wall time at the transmitting device and other control information. A receiving node or slave device receiving the beacon frame synchronizes its local time by accepting the timing information in the beacon frame and setting its TSF counter to the value of the received timestamp if the timestamp indicates a wall time later than the node's TSF counter.

However, neither PTP nor TSF provide for synchronization of the media or sample clocks which control the rate at which application data is processed by the processing elements of the network's devices. The Audio Video Bridging Transport Protocol (AVBTP) of "IEEE 1722-2011: Layer 2 Transport Protocol for Time Sensitive Applications in a Bridged Local Area Network" provides that each network end point (a device that receives or transmits data) is to recover the sample clock from data in the packetized data stream transmitted by the data source. Each data packet comprises plural application data samples, for example, audio data samples, and a time stamp indicating the wall time at which presentation of the application data in the packet is to be initiated. At each network end point, for example, an audio speaker unit, a sample clock is generated which oscillates at a frequency that enables the plural application data samples in a data packet to be presented for processing within the time interval represented by successive timestamps.

While PTP, TSF and AVBTP provide means for synchronizing distributed clocks, not all packets transmitted by a network data source, particularly packets transmitted wirelessly, reach their destinations. As packets are lost, each network end point, for example, the plural speaker units of a surround sound audio system, receives a respective aliased subsample of the timestamps and over time the clocks of the respective network endpoints will not track. What is desired, therefore, are accurate consistently synchronized sample clocks at a plurality of related network endpoints.

DETAILED DESCRIPTION OF PREFERRED EMBODIMENTS

Figure 1:
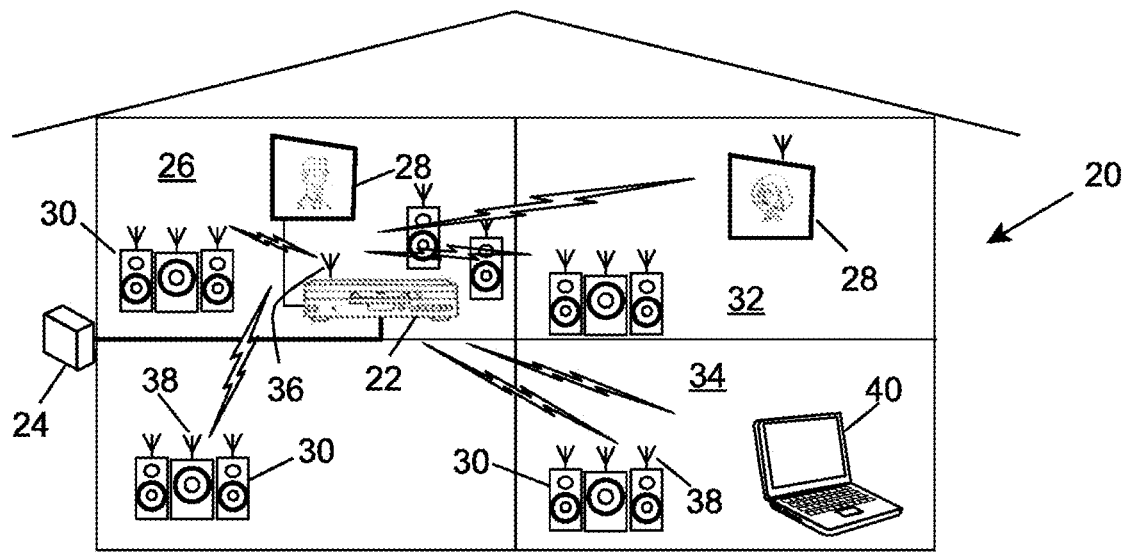
FIG. 1 is a pictorial representation an exemplary audio/video/data distribution network.

Referring in detail to the drawings where similar parts are identified by like reference numerals, and, more particularly to FIG. 1, in a residence 20 data, including video and audio data, is often retrieved from a storage medium, such as a digital versatile disc (DVD) by a DVD player or from a data portal 24 connected to, for example, a wide area fiber optic network or a satellite receiver, and distributed throughout the residence. For examples, digital video and/or multi-channel audio may be distributed from a source 22, for example, a DVD player, located in a media room 26 or closet for presentation by video displays 28 and/or surround sound or stereo speaker units 30 in the media room, a bedroom 32 or a den 34. Since it is difficult to retrofit a finished structure with network cabling at least part of the distribution network may comprise a radio transmitter 36 which may be part of an audio/video/data source 22 and one or more radio receiver(s) 38 which may be incorporated in the networked devices such as a computer 40, a video display 28, or the speaker units 30 of one or more stereo or surround sound systems.

Synchronization of the various outputs and minimization of system latency are critical requirements of high quality audio/video systems. Source-to-output delay or latency ("lip-sync") is important in audio/video systems, such as home theater systems, where a slight difference, on the order of 50 milliseconds (ms), between display of a video sequence and the output of the corresponding audio is noticeable. On the other hand, the human ear is even more sensitive to phase delay or channel-to-channel latency between the corresponding outputs of the different channels of multi-channel audio. Channel-to channel latency greater than 1 microsecond ($\mu$s) can result in the perception of disjointed or blurry audio.

Audio video bridging (AVB) is the common name of a set of technical standards developed by the Institute of Electrical and Electronics Engineers (IEEE) and providing specifications for time-synchronized, low latency, streaming services over networks.

Figure 2:
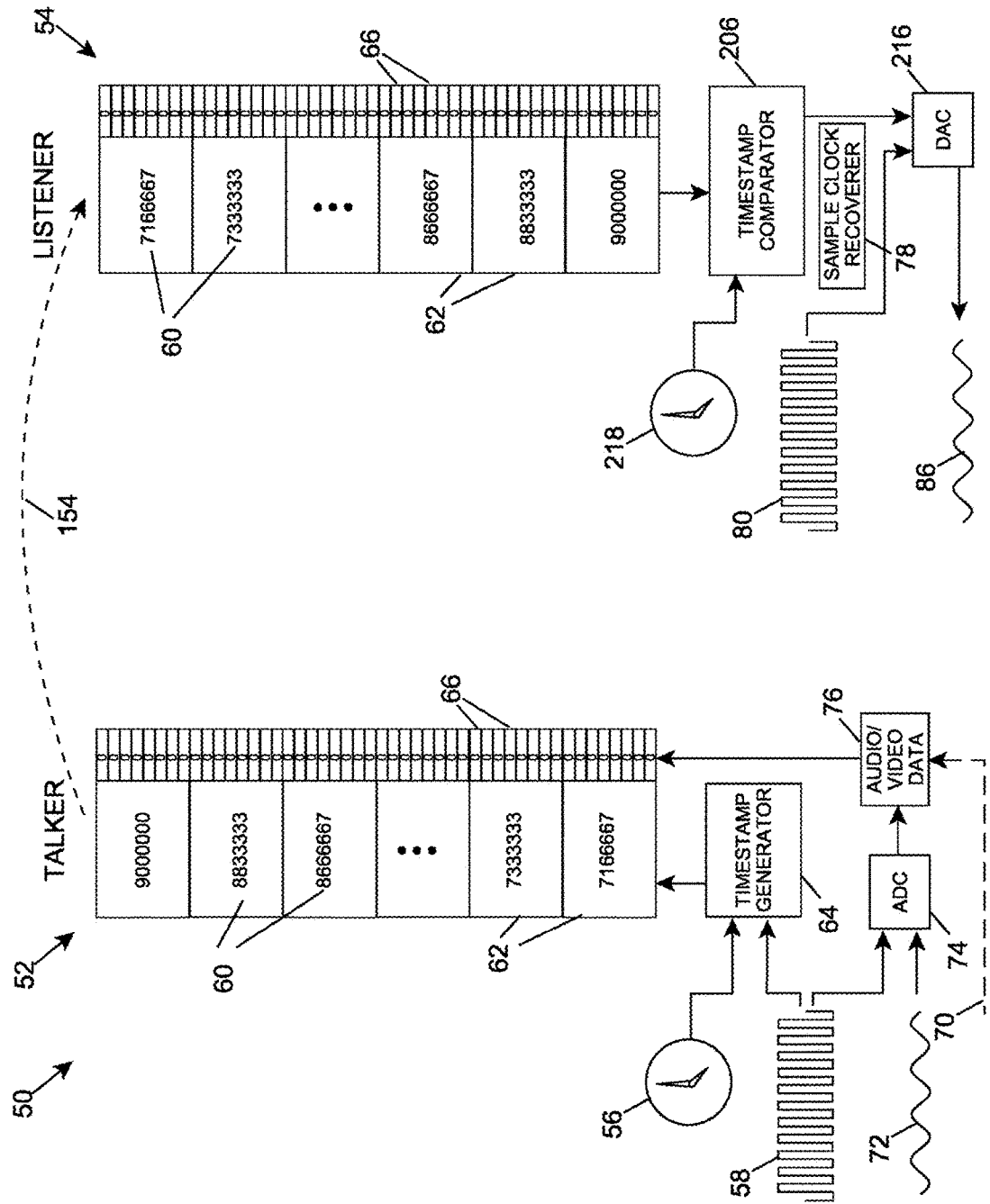
FIG. 2 is a graphic representation of a method of assembling and presenting application data included in data packets having AVBTP timestamps.

"IEEE 802.1AS-2011—IEEE Standard for Local and Metropolitan Area Networks—Timing and Synchronization for Time-Sensitive Applications in Bridged Local Area Networks" describes a system for synchronizing clocks distributed among the nodes of one or more networks of devices. Referring also to FIG. 2, in an audio video bridging (AVB) network 50, each network endpoint, a network node capable of transmitting and/or receiving a data stream, includes two clocks; a "wall" clock 56, 218 and a "media" or "sample" clock 58, 80. Wall time output by the wall clock 56, 218 determines the real or actual time of an event's occurrence and/or the real or actual time difference between the initiation of a task and the task's completion. The sample clock 58, 80 is typically an alternating signal which controls the rate at which data is passed to a media processing device for processing. For examples, in a digital audio system, sample clocks govern the rate at which an analog signal is sampled and the rate at which digital samples are to be passed to a digital-to-analog converter (DAC) controlling the emission of sound by a speaker.

Figure 3:
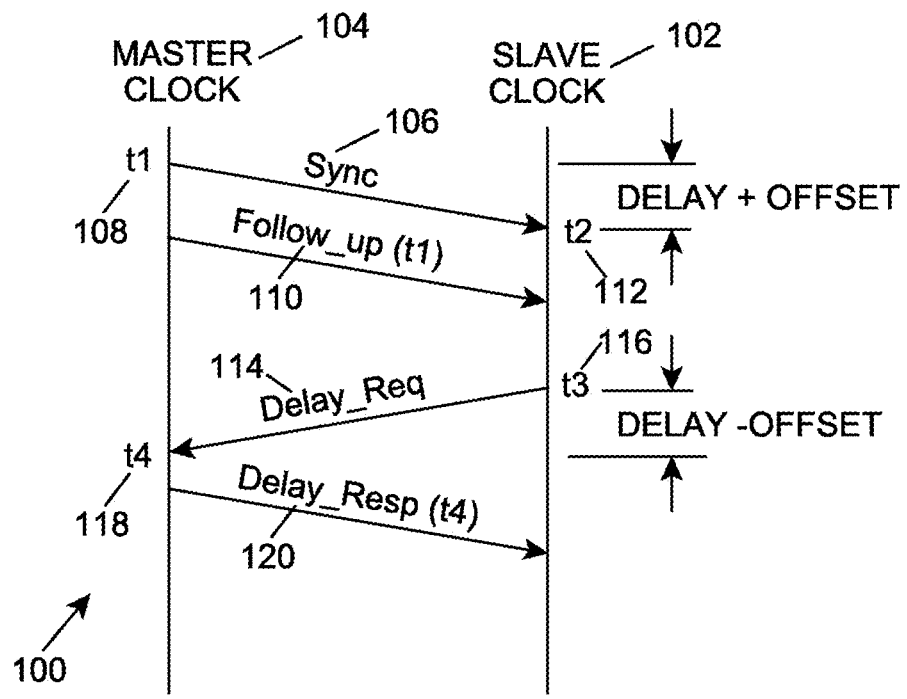
FIG. 3 is a graphical representation of the Precise Time Protocol (PTP) message exchanges between a master clock and a slave clock.

Referring also to FIG. 3, the Precision Time Protocol (PTP) of "IEEE Standard for a Precision Clock Synchronization Protocol for Networked Measurement and Control Systems," IEEE Std. 1588-2008 provides a method 100 of synchronizing the wall time at "slave" clocks 102 distributed among the nodes of a network to the wall time of the network's "master" clock 104.

When operation of a network is initiated, a master clock is selected either manually or by a "best master clock" algorithm. Afterward, messages are periodically exchanged between the device comprising the master clock (the "master device") and the network devices comprising the slave clocks (the "slave devices") enabling determination of the offset, the time by which a slave clock leads or lags the master clock, and the network delay, the time required for data packets to traverse the network. At defined intervals, by default two second intervals, the master device multicasts a Sync message 106 to the other network devices. The precise master clock wall time of the Sync message's transmission, t1, 108 is determined and included as a timestamp in either the Sync message or in a Follow-up message 110. The slave device determines the local wall time, t2, 112 at which the device received the Sync message. A Delay_Req message 114 is then sent by the slave device to the master device at time, t3, 116. The master clock's time of receipt, t4, 118 of the Delay_Req message 114 is determined and the master device responds with a Delay_Resp message 120 which includes a timestamp indicating t4, 118. The slave device determines the network delay and the slave clock's offset from the four times, t1, t2, t3 and t4:

$$\text{Delay+Offset}=t2-t1 \quad (1)$$

$$\text{Delay-Offset}=t4-t3 \quad (2)$$

$$\text{Delay}=((t2-t1)+(t4-t3))/2 \quad (3)$$

$$\text{Offset}=((t2-t1)-(t4-t3))/2 \quad (4)$$

Consecutive measurements of the offset also permit compensation for the slave clock's frequency drift. With the time and frequency drift determined, each slave clock is adjusted to match the wall time of the master clock by adding or subtracting the offset to or from the local wall time and adjusting the slave clock's frequency.

IEEE 802.11, "IEEE Standard for Information Technology—Telecommunications and Information Exchange Between Systems Local and Metropolitan Area Networks" provides media access control (MAC) and physical layer (PHY) specifications for implementing wireless local area networks (WLAN) referred to basic service sets (BSS). The devices which are parts of a BSS are identified by a service set identification (SSID) which may be assigned or established by the device which starts the network. Each network device or station includes a local timing synchronization function (TSF) timer, the device's wall clock 56, 218, which is based on a 1 mega-Hertz (MHz) clock which ticks in microseconds. During a beacon period all stations in an independent basic service set (IBSS) compete to transmit a beacon. Each station calculates a random delay interval and sets a delay timer scheduling transmission of a beacon when the timer expires. If a beacon arrives before the delay timer expires, the receiving station cancels its pending beacon transmission. The beacon comprises a beacon frame including a timestamp indicating the TSF timer value, the wall time, of the station that transmitted the beacon. Upon receiving a beacon, if the timestamp is later than the receiving station's TSF timer the receiving station sets its TSF timer, for example the wall clock 218, to the value of the timestamp thus synchronizing the TSF timers, the wall clocks, of the transmitting station and the receiving station.

PTP and TSF are responsible for synchronizing the wall clocks of all nodes in the respective network to the same wall time but not for synchronizing the sample clocks controlling the processing of the various media transported by the network. The sample clocks are recovered from the data stream at each of the network's listeners, endpoints receiving the data stream, enabling different sample clocks for different media to be transported on the same network.

Referring to FIG. 2, media sources or talkers 52 embed presentation timestamps 60 in certain data packets 62 transmitted by the respective source. A timestamp generator 64, controlled by the talker's sample clock 58 for the particular medium being processed, inserts a timestamp 60 into a header of a data packet 62 with the wall time from the talker's wall clock 56 as adjusted by a latency normalization value, if any. The timestamp indicates the wall time at which presentation of application data included in the data packet is to be initiated. Plural blocks 66 of application data 76, such as Inter-IC Sound (128) digital audio data, which are obtained from a digital data source 70 or converted from an analog signal 72 by an analog-to-digital converter (ADC) 74 at a rate determined by the sample clock 58 are also included in each data packet 62. A data block count, included in the header of the data packet, specifies the number of application data blocks 66 to be presented in the interval represented by the difference between successive presentation timestamps. At the listener 54, the sample clock 56 is recovered by a sample clock recoverer 78.

Figure 4:
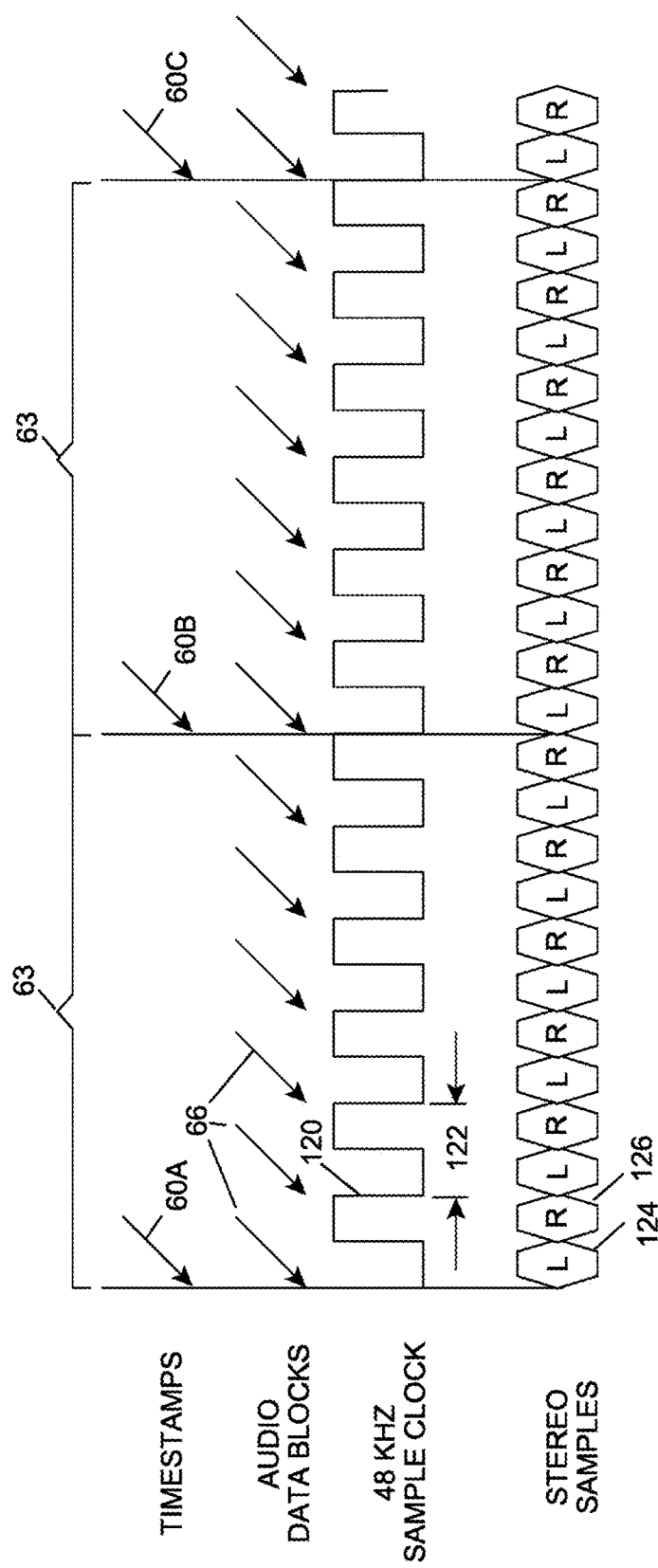
FIG. 4 is a graphical representation of a method of sample clock recovery.

Referring also to FIG. 4, within the time interval 63 (indicated by a bracket) represented by successive timestamps 60A, 608, 60C the sample clock recoverer 78 triggers a clock edge 120 completing a sample clock cycle 122 for each of the data packet's application data blocks 66 specified in the data block count in the data packet header. In a two channel (stereo) audio system each I2S data block contains a respective data sample 124, 126 for each of the two channels.

In U.S. Ser. No. 14/186,852, the sample or media clock recovery provides, in essence, a distributed phase locked loop (PLL) for the network with identical sample clocks generated at each listener 54 processing a respective medium. As taught herein, rather than using PLL hardware, this application accomplishes these functions with an Estimator 308 and a Sample Rate Converter (SRC) code 310.

Ideally, AVB synchronizes the outputs of the network's listeners by delivering data to each end point's media interface, for examples, a controller for a video display or the digital-to-analog converters (DAC) of plural wireless speakers, at the synchronized wall times specified in the timestamps and at a rate determined by synchronic sample clocks.

While ideally the sample clocks regulating the rendering the each medium and the wall clocks controlling presentation time are synchronized, packets are commonly lost in a wireless network and each receiver receives a respective aliased subsample of the data packets and accompanying timestamps conveyed in the data stream. Loses during packet transfer, clock jitter and resulting sample clock variation make it difficult to maintain less than 50 µs channel-to-channel latency which is desired for high quality, multi-channel, surround sound audio. The inventor concluded that synchronicity in presenting related content at plural network endpoints would be promoted by introducing a frequency filtering function in the clock path at a sample clock recoverer enabling recovery of a band limited sample clock which is, in turn, copied to other listeners requiring the same sample clock, for example, plural surround speaker units of an audio/video system.

Figure 5A:
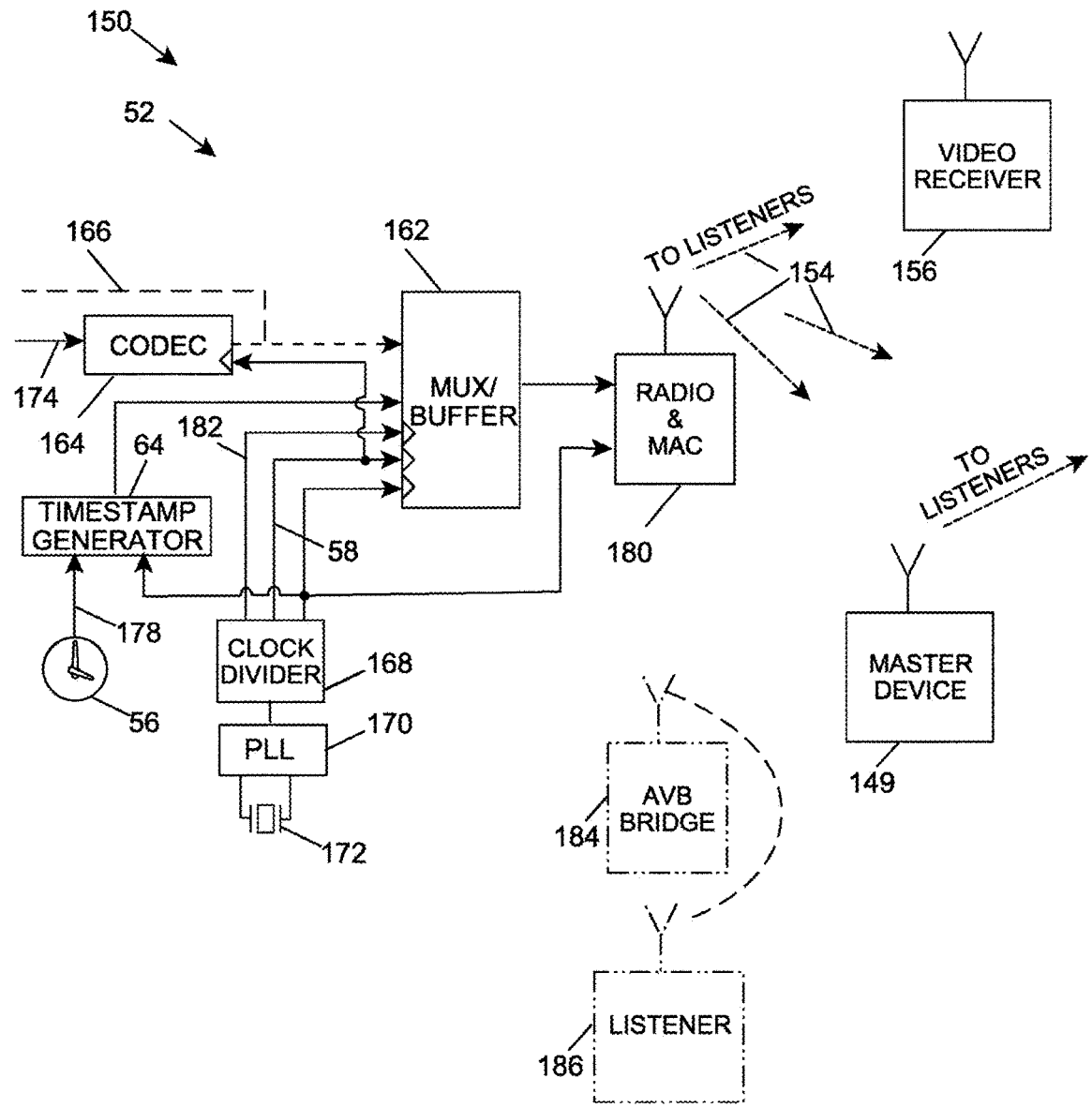
FIG. 5A is a block diagram of a first portion of a wireless network.

Referring also to FIGS. 5A and 58, a wireless network 150, for example a network transporting video and surround sound audio, comprises plural network endpoints (stations) 52, 149, 156, 158, 160, 162A-162C. One of the end points 149 includes the master clock or master TSF timer and periodically transmits a PTP message or a TSF beacon frame to facilitate synchronization of the wall clocks, for examples wall clocks 178, 218, of the other network endpoints.

One of the network's endpoints is a talker 52 that receives application data, for example, audio and/or video data, from a source such as a digital video disk (DVD) player or a television set-top box, and transmits the data in a packetized serial data stream 154 to a plurality of listeners 54, for examples, a wireless video display 156 and a plurality wireless speakers 158, 160, 162A-162C for multichannel surround sound. Six channel surround sound audio systems, known as 5.1 ("five point one") surround systems, utilize five full bandwidth channels; a front left channel, a front center channel, a front right channel and left and right surround channels, each reproduced by a corresponding speaker. In addition, the 5.1 surround sound system includes one low-frequency effects channel, the point one (0.1) channel, which is reproduced by a subwoofer.

Increasingly, manufacturers of home theater systems are adopting eight channel (7.1) surround sound and high end systems, such as an 11.1 surround sound system, are contemplated.

The talker 52 comprises a multiplexer/buffer (MUX/buffer) 162 which serially, packetizes digitized analog audio/video data 174 output by a coder/decoder (codec) 164 or digital audio/video data 166 obtained from a digital data source. A clock divider 168, driven by phase locked loop (Type-II PLL) 170 and a crystal oscillator 172, outputs a sample clock 58, an alternating signal, which times the sampling of the analog audio/video data 174 by the codec 164. The sample clock 58 is also input to a timestamp generator 64 which based on wall time 178 output by the talker's wall clock 56 produces a presentation timestamp 60 indicating the wall time for initiating presentation of application data in a data packet 62 and signals the MUX to insert the presentation timestamp into the header of the data packet. The sample clock 58 is also input to the MUX/buffer 162 to control the rate at which the MUX captures the data at its inputs and multiplexes the data to serial data packets containing plural application data samples, for example audio data samples. The serialized data packet is buffered and transmitted from the buffer to a radio transceiver/media access controller (MAC) 180. A bus interface clock signal 182 times the transmission of the packetized data from the MUX/buffer 162 to the radio transceiver and MAC. The media access controller (MAC) adds a media access address identifying the device that is to receive the data packet and the transceiver modulates the data packet with a carrier and transmits the radio frequency data stream 154 to appropriate network listeners, for examples, a receiver of the video display 156 and the respective receivers of the surround sound audio speaker units 158, 160, 162A-162C. AVB also provides for transmissions to a "bridge" 184 which may relay data transmitted by the talker 50 to a second network, including listener 186, and which acts as a slave clock to the talker network's grandmaster clock and as a master clock to the network, comprising listener 186, to which it retransmits the data.

Each of the network's listeners, for example, the speaker units 158, 160, 162A-162C of the surround sound system, receive packetized data 154 transmitted by the talker 52 to the listener's respective MAC address. However, particularly in a network comprising a wireless communication link, data packets may be lost so each listener may receive only an aliased subset of the transmission. In the network 150, one of the plural speaker units 158 is designated as the sample clock recoverer for the other speaker units 160, 162A-162C of the surround sound system. The radio transceiver and MAC unit 202 of the sample clock recoverer receives the steam of data packets addressed to speaker unit 158 and transmits them to a demultiplexer/buffer 204 where the data in the data packets are disassembled and buffered. The presentation timestamp 60 for each data packet is transmitted to a timestamp comparer 206.

The time interval 63 represented by successive time stamps is signaled to a Type-II PLL 208 by the timestamp comparer 206. In addition, the number of data blocks in a data packet, as specified in the data block count field in the packet header, is input to a counter 210 in a feedback loop of the PLL 208. Within the time interval represented by the difference between successive timestamps, the counter 210 in the feedback loop causes the PLL 208 to output an alternating signal, a raw recovered sample clock 79, with a respective clock edge 120 for each of the data blocks 66 included in the data packet. The raw recovered sample clock 79 is input to a low bandwidth Type-II PLL 211 which frequency filters the raw sample clock signal to eliminate jitter and produce a cleaner band limited recovered sample clock signal 80. Band limiting the recovered sample clock signal produces a signal with a frequency centered on the mean frequency of the raw signal, substantially reducing jitter in the sample clock signal so that the sample clocks of other listeners utilizing the recovered sample clock, for example, the other surround sound speaker units 160, 162A-162C, are more nearly identical to the recovered sample clock 80.

The bandlimited recovered sample clock 80 is also input to a clock divider 212 which outputs a bus clock signal 214 to the buffer/DEMUX 204. The recovered sample clock signal 80 is transmitted to the buffer/DEMUX 204 and to the digital-to-analog converter (DAC) 216 to control the processing rate for the audio data samples contained in the data packets. The timestamp comparer 206 compares the timestamp in the data packet to the wall time of the slave clock 218 of the speaker unit and appropriately outputs a signal to the DAC when the DAC is to initiate converting the respective digital audio data, at the rate established by the recovered sample clock 80, to an analog signal 86 which controls the operation of the speaker 220.

The bandlimited recovered sample clock 80 is transmitted to the transceiver and MAC 202 of the sample clock recoverer 158 where it is modulated with a carrier and transmitted to other surround sound speaker units 160, 162A-162C. Anticipating packet loss and satisfying the Nyquist sampling criterion, the rate at which the sample clock information is updated at the other speakers is set at least twice the limiting bandwidth of the recovered sample clock. For example, if the timing at a speaker is updated every 100 ms and the peak packet error rate (PER) is 75%, the low bandwidth PLL 211 of the sample clock recoverer 158 is set to no more than 1.25 Hz. The modulated recovered sample clock signal is received by the transceiver and MAC 240 of the other speaker unit(s) where it is input to the respective buffer/DEMUX units 242 and transmitted to the DAC 244 to control the rate at which audio data samples in data packets addressed to the respective MAC by the talker 52 are processed. The timestamps 60 in the data stream are separated from the application data and compared to the synchronized local wall time 246 by the timestamp comparer 248 which signals the buffer/DEMUX to input the application data from the respective data packet to the DAC 244 for presentation by the speaker.

Alternatively, the bandlimited sample clock may be recovered without frequency filtering the raw sample clock output. Referring also to FIG. 5C, the raw PTP and TSF wall time data 217 contained respectively in the PTP messages and TSF beacon frames is separated in the buffer/DEMUX 204 of the listener 159 and transmitted to a frequency filtering device, preferably, a low band width Type-II PLL 219, to band limit the wall time around the average or mean frequency. The band limited PTP and TSF time signal 221 reduces jitter at the wall clock 218 of the listener 159 which band limits the sample clock output 80 of the PLL 208 which is input to the buffer/DEMUX 204 and the DAC 216. The bandlimited wall time 223 is transmitted 261 to the other listeners 161, 162A-162C, including the talker 52, where it is input to the respective timestamp comparers 64, 249 causing the bandlimited sample clock 80 to be output by the respective PLL 209. The application data in the data stream 154 from the talker is processed at a rate determined by the bandwidth limited sample clock 80 and presented at wall times determined by the synchronized local wall time 223.

Figure 5B:
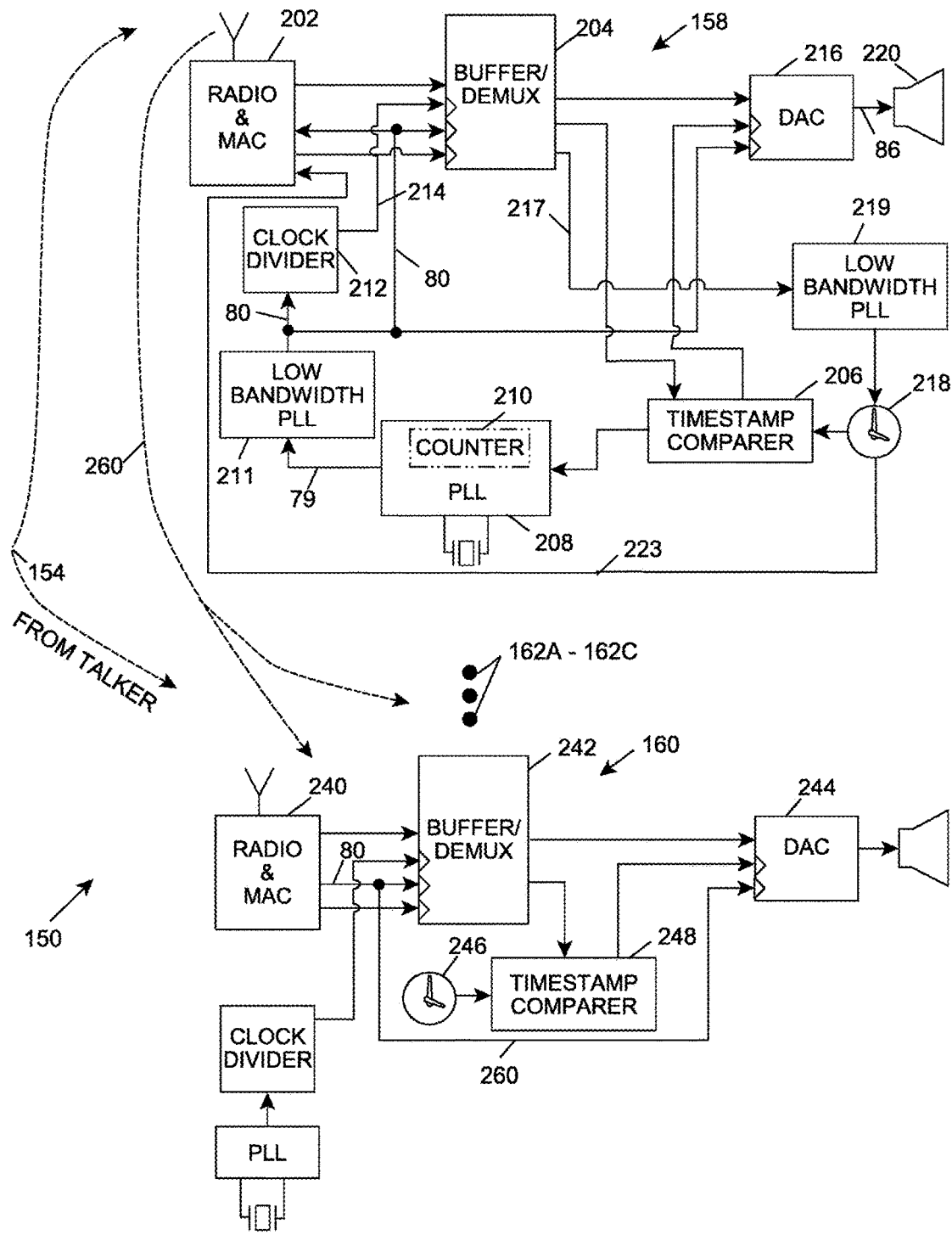
FIG. 5B is a block diagram of a second portion of the wireless network of FIG. 5A including a first embodiment of a sample clock recoverer.
Figure 5C:
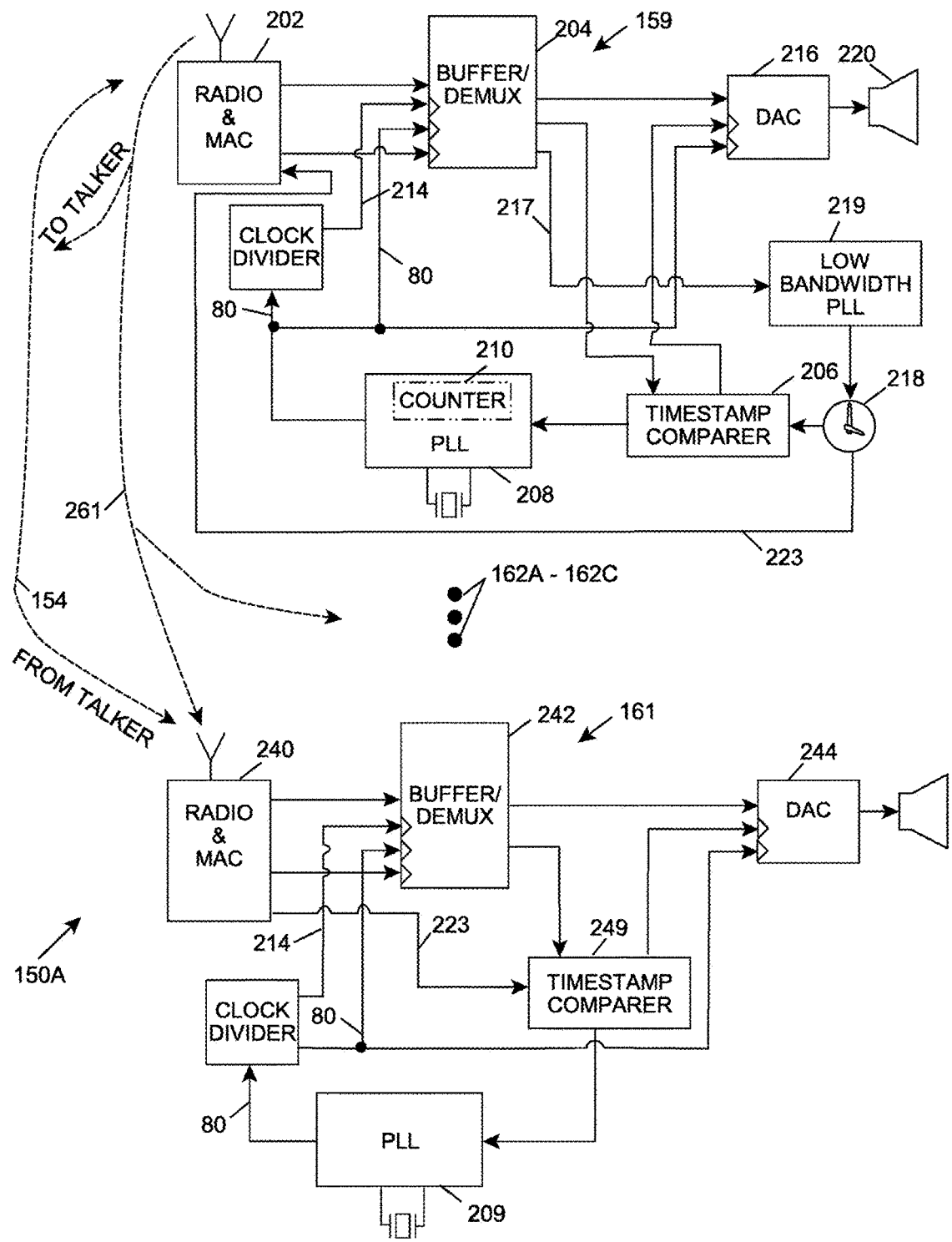
FIG. 5C is a block diagram of a second portion of the wireless network of FIG. 5A including a second embodiment of a sample clock recoverer.

Alternatively, as illustrated in FIG. 5B, the frequency filtering function can be applied to both the output of the PLL 208 and the raw wall time data 217. The low bandwidth PLL 219 band limits wall time 223 which can be transmitted to the other listeners of the network with the bandlimited sample clock 80.

By introducing a frequency filtering function in the clock path with the low bandwidth PLL 211 and/or the low bandwidth PLL 219 jitter is removed from the sample clock and/or the wall clock substantially reducing aliasing and improving the synchronization of the outputs of the network.

In an alternate embodiment, the TSF PLL above is replaced with an Estimator which measures and filters TSF value against the internal Counter/Timer of the audio subsystem processor. The Estimator is presented with TSF and Counter pairs sampled at the same instant, so that the frequency and delay relationship between the two can be determined as seen in FIG. 7.

Figure 7:
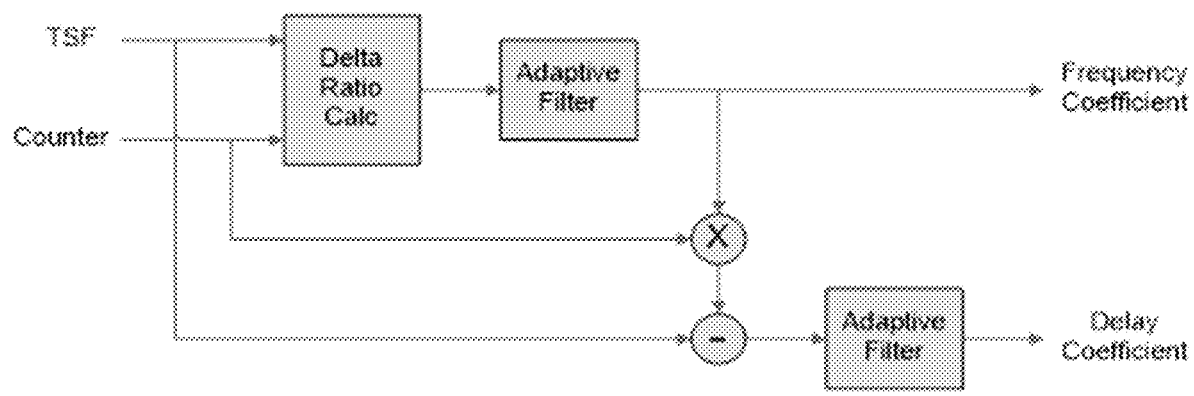
FIG. 7 is a graphical representation of an Estimator with TSF and Counter pairs sampled at the same instant, so that the frequency and delay relationship can be seen.
Figure 8:
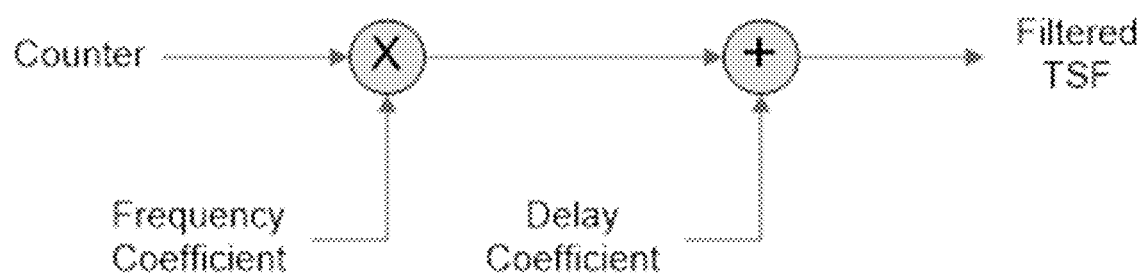
FIG. 8 is a graphical representation of Frequency and Delay Coefficients generated that are then applied to the Counter value at any time to generate the filtered TSF.

From the Estimator shown in FIG. 7, the Frequency and Delay Coefficients are generated which then can be applied to the Counter value at any time to generate the filtered TSF value, as shown in FIG. 8. Adaptive filters are required for this application, so that the Coefficients are available immediately to be used to process audio and over time will improve in accuracy by lowering the jitter.

This filtered TSF value is used at the audio talker to generate the Presentation Time of the block of audio data that is transmitted. The block size is set to be some multiple of the audio data interleaver length.

Figure 9:
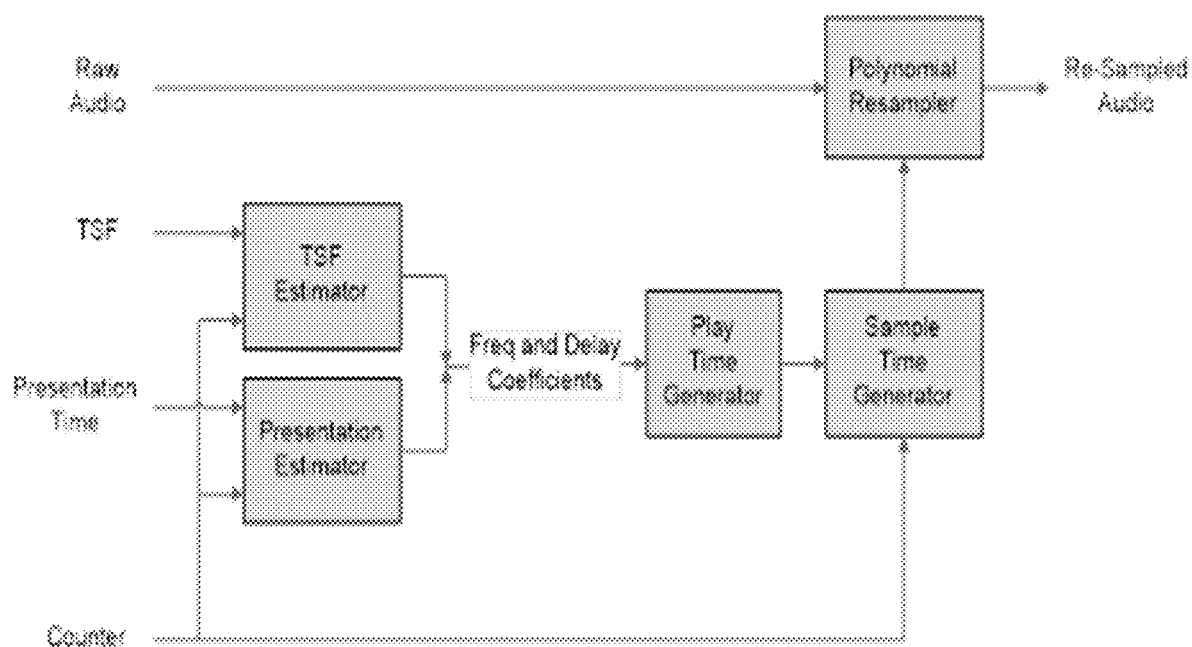
FIG. 9 is a graphical representation of the audio being resampled to the local audio clock rather than using a PLL to generate the clock.

At the audio listener the Presentation Time and the beacon TSF values are estimated to the local audio clock by the same method used at the audio transmitter source. The audio is then resampled to the local audio clock rather than use a PLL to generate the clock as shown in FIG. 9.

Figure 6:
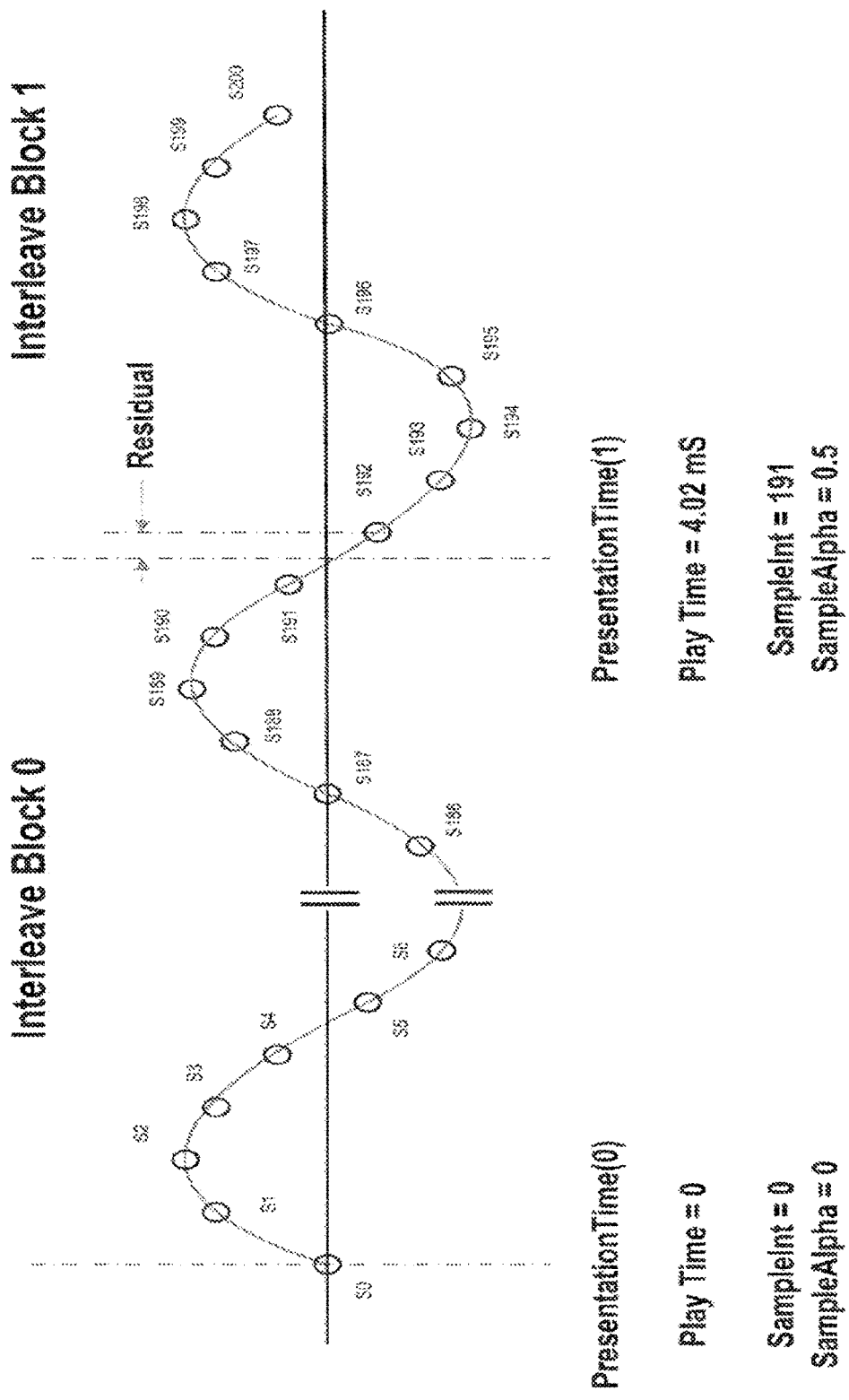
FIG. 6 is a graphical representation of a sample timing for the resampler.

The frequency and delay coefficients are combined (Frequency Coefficients are multiplied and Delay Coefficients are added) to make the Play Time of each block. The Play Time is used to generating the sample timing for the resampler. An example of this sample timing is shown in FIG. 6 where Sx denotes sampling intervals.

At the start of the audio playback the sample spacing is assumed to be ideal, and at the beginning of each new block the Play Time is compared to elapsed time to that point. The residual error from the previous block is then then compensated for in the new block dividing the previous error equally over all samples of the new block or alternatively future blocks recursively. This allows the audio playback to start immediately without having to wait for the next PlayTime to determine the exact sample spacing.

In prior applications, a hardware methodology for recovering and filtering audio timing was presented. The key circuit element in the prior approach, which is not available on most generic processor SOCs, is a low bandwidth Phase lock Loop (PLL). This PLL was used twice; to filter the beacon based Time Synchronization function (TSF) value and to generate the output audio clock (see 208 and 210). For a soft implementation, these two hardware functions are converted to an Estimator (308) and a Sample Rate Converter (SRC) code (310).

In the present application, the TSF PLL is replaced with an Estimator (308) which measures and filters TSF value against the internal Counter/Timer of the audio subsystem processor. The Estimator is presented with TSF and Counter pairs sampled at the same instant so that the frequency and delay relationship between the two can be determined.

An embodiment of this system is illustrated in FIG. 7. For purposes of this embodiment, it may be assumed that the following Interleaving Block Size

| At 48 kHz | Interleaver size: in packets per interleaving | |
|---|---|---|
| Packet size: in samples per packet | 48 96 | 4 192 384 | 8 384 768 |

From this Estimator (308), the Frequency and Delay Coefficients are generated which then can be applied to the Counter value at any time to generate the filtered TSF value as shown in FIG. 8. Adaptive filters are required for this application so that the Coefficients are available immediately to be used to process audio and over time will improve in accuracy by lowering the jitter.

This filtered TSF value is used at the audio talker to generate the Presentation Time of the block of audio data that is transmitted. The block size is set to be some multiple of the audio data interleaver length.

At the audio listener, the Presentation Time and the beacon TSF values are estimated to the local audio clock by the same method used at the audio transmitter source. The audio is then resampled to the local audio clock, rather than to a PLL to generate the clock as shown in FIG. 9.

The frequency and delay coefficients are combined (Frequency Coefficients are multiplied, and Delay Coefficients are added) to make the Play Time of each block. The Play Time is used to generating the sample timing for the resampler, an example of which is as illustrated in FIG. 6.

At the start of the audio playback, the sample spacing is assumed to be ideal, and at the beginning of each new block, the Play Time is compared to elapsed time to that point. The residual error from the previous block is distributed over the next block or alternatively future blocks recursively. This allows the audio playback to start immediately without having to wait for the next PlayTime to determine the exact sample spacing.

One embodiment of this method of recovering audio timing in a network includes bandlimiting a raw wall time signal about a mean frequency of the raw wall time signal by estimating the frequency and delay of the raw wall time signal to a local transmitter audio clock; including timing datum in a data packet about the mean frequency of the timing signal from the estimate of the frequency and delay of the timing signal and the audio playtime at the transmitter; bandlimiting the raw wall time signal about the mean frequency of the raw wall time signal by estimating the frequency and delay of said raw wall time signal to a local receiver audio clock; combining both wall time estimation and received timing datum estimation from a packet to generate an audio play time at the receiver; using the playtime generate coefficients for a polynomial interpolator that resamples the audio to the receiver audio clock.

In another embodiment, an audio system is provided, where the audio system comprises a first listener having a wall clock maintaining a wall time for occurrence of an event, said wall time updated by data transmitted by a master clock and received by said first listener; a sample clock recoverer retrieving a sample clock from data received by said first listener from a talker, said sample clock regulating a processing rate for a datum included in said data received from said talker; and a frequency filter bandlimiting said sample clock output by said sample clock recoverer, wherein said frequency filter comprises an estimator connected to receive said sample clock output by said sample clock recoverer; and a transmitter transmitting said bandlimited sample clock; and the audio system further comprises a second listener arranged to receive said transmitted bandlimited sample clock and use said bandlimited sample clock to regulate processing data received from said talker. Such a system may include that first listener is a frequency filter attenuating a frequency of said updating data received from said master clock. Such a system may include that the updating data received from said master clock is a timing synchronization function datum or a precision time protocol datum.

In an alternate embodiment, an Estimator is provided that performs three algorithmic phases that operate to cancel audio echo. The Estimator comprises an Adaption phase, a Settling phase, and a Frequency Tracking phase. In the Adaptation phase, an Estimator measures the timing relationship between the internal Counter/Timer of an audio subsystem processor and a Wi-Fi Network Time Synchronization Function using the linear equation Filtered TSF=Counter*Frequency Coefficient+Delay Coefficient as shown in FIG. 8.

The Estimator is presented with TSF and Counter pairs sampled at the same instant so that the frequency and delay relationship between the two can be determined. The Estimator uses a fixed number of samples (N) in its processing. The value of N is determined by the target timing jitter output of the Estimator and the input jitter from the TSF sampling. The input to output jitter is reduced by the Square Root of N. The preferred value for N is 1024 and the preferred jitter reduction is 32.

In the Adaptation phase there are less than N samples available, but the available samples are used to generate a Filtered TSF although the preferred jitter reduction of 32 may not yet be met.

If it is not possible to obtain the Wi-Fi Network Time Synchronization Function then the Estimator may use other methods to determine the filtered TSF. The Estimator may use a pseudo beacon where a TSF is generated by the audio system and transmitted to output devices, such as audio speakers, that are connected to a wireless network. The output devices accept the generated TSF as the network time. The Estimator may also query the output devices for a time function and use the returned time function as the TSF. In some embodiments, the output devices have access to the Wi-Fi TSF and return that value to the Estimator. In some embodiments, the Adaptation phase can use any timing method that represents time in a first order linear relationship (y=mx+b) where, if plotted on a 2-dimensional x/y axis, m is the slope of the line and b is the y-intercept. The y-intercept of this line is the value of y at the point where the line crosses the y axis.

In the Settling phase, there are sufficient samples to achieve the preferred jitter reduction of 32. These samples are processed and output until the transient response of the N length filter has settled.

The Adaption and Settling phases can be illustrated as shown in FIG. 7.

In the Adaption and Settling phases a TSF, whether it be the Wi-Fi TSF accessed by the audio system, a pseudo TSF, or a TSF returned by querying an output device and a Counter is input into a Delta Ratio Calculation. The Delta Ratio Calculation function is the change of the TSF value divided by the change in the Counter value. With the variable n representing the index of the TSF and Counter sample pairs, the Delta Ratio={TSF(n)−TSF(n−1)}/{Counter(n)−Counter(n−1)}. However, since the samples may be taken at a fixed counter increment interval, the Delta Ratio Calculation may be expressed as {TSF(n)−TSF(n−1)}/CounterInterval. The output is passed through an Adaptive filter, which is a filter that changes over time. In the first iterations of the Estimator, the Adaptive filter is operating based on the number of N samples that have occurred. In subsequent iterations of the Estimator, the number of N samples used in the Adaptive filter are sufficient to achieve the desired jitter reduction. The Adaptive filters are required for this application so that the Coefficients are available immediately to be used to process audio and over time will improve in accuracy by lowering the jitter.

The output of the Adaptive filter is the Frequency Coefficient. To calculate the Delay Coefficient, the Frequency Coefficient is multiplied by the Counter, as shown in FIG. 8, then reduced by the TSF. That result is then run through the Adaptive filter. The output from the Adaptive filter is the Delay Coefficient.

In the Frequency Tracking phase, after the Frequency Coefficient and Delay Coefficient have been determined, the crystal drift of an audio system is tracked and adjusted for. The previously determined Frequency and Delay Coefficients are stored in registers. The Delay Coefficient is set and does not change during the Tracking phase, but very small adjustments are made to the Frequency Coefficient. The Frequency Coefficient is tracked and adjusted to eliminate the crystal drift of the system. Crystals in an audio system may change their oscillation frequency, because of changes in temperatures or power supply voltages.

In the Frequency Tracking phase the frequency adjustment range must be limited to +/−3 PPM per second. If the frequency slew exceeds this limit Audio Echo Cancelling (AEC) applications on the audio system may fail.

Figure 10:
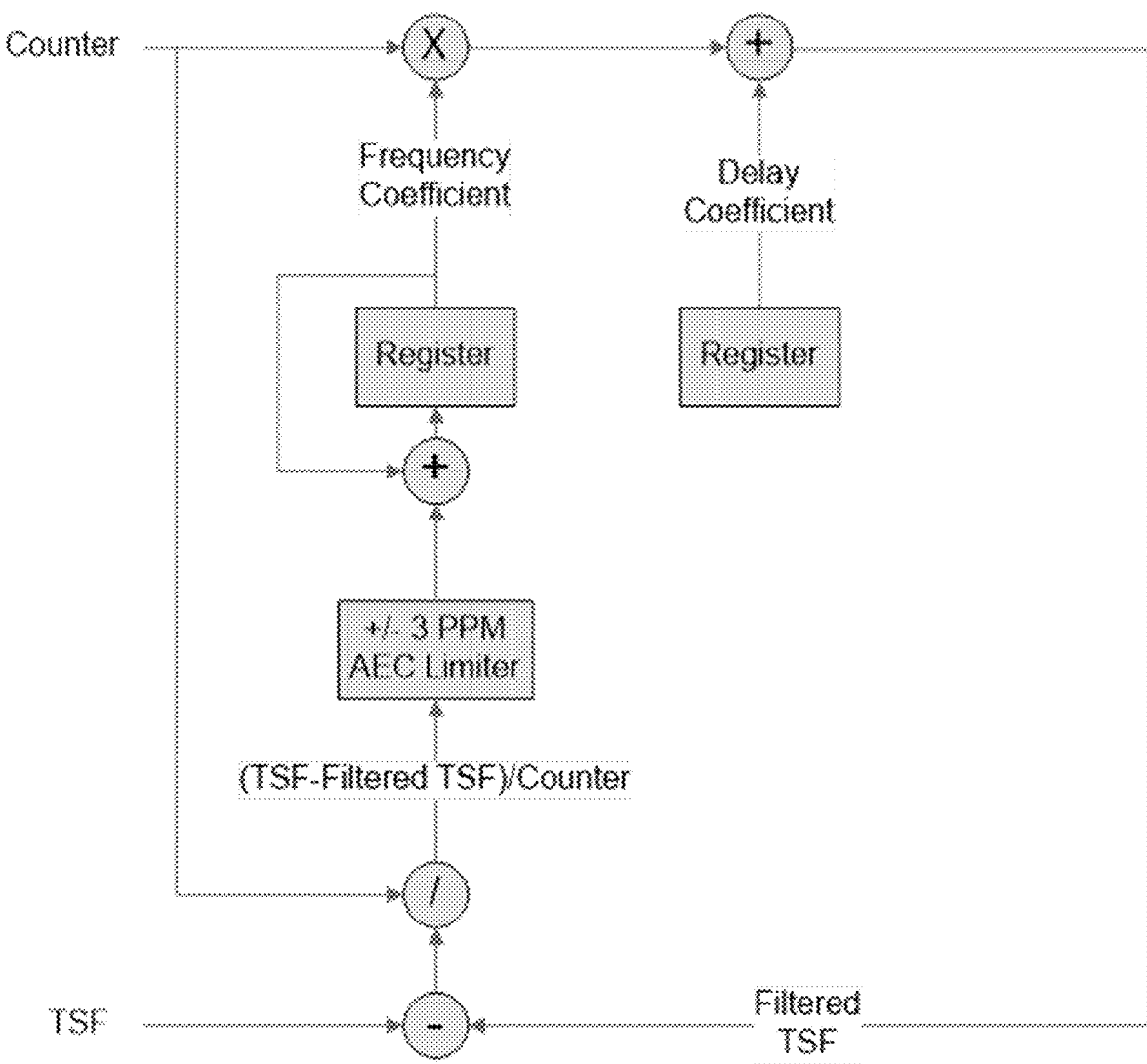
FIG. 10 is a graphical representation of the multiplication of the Counter during the Frequency Tracking phase.

During this Frequency Tracking phase, the Counter is multiplied by the Frequency Coefficient that was determined in the Adaptation and Settling phases as shown in FIG. 10. The Delay Coefficient is retrieved from memory and added to the resultant to produce the Filtered TSF. The actual TSF, which can be a Wi-Fi Network Time Synchronization Function, a generated pseudo beacon TSF, a queried time value, or any value that represents time as a function of y=mx+b, is subtracted from the Filtered TSF to generate an averaged timing offset. The averaged timing offset is divided by the counter then limited by a plus-or-minus 3 parts per million AEC limiter to create a limited value.

The limited value is then added to the pre-existing Frequency Coefficient, and then stored in memory. This process repeats as long as the audio system is in use. In some embodiments, the addition of the limited value to the Frequency Coefficient is an accumulator where the error in the Frequency Coefficient is accumulated and stored over time. The Delay Coefficient is not adjusted and remains at the value that was determined in the Adaptation and Settling phases.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

All the references cited herein are incorporated by reference. The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

We claim:
1. An audio system comprising:
    (a) a first listener including:
        (i) a wall clock maintaining a wall time for occurrence of an event, said wall time updated by data transmitted by a master clock and received by said first listener;
        (ii) a sample clock recoverer retrieving a sample clock from data received by said first listener from a talker, said sample clock regulating a processing rate for a datum included in said data received from said talker; and
        (iii) a frequency filter bandlimiting said sample clock output by said sample clock recoverer, wherein said frequency filter comprises an estimator connected to receive said sample clock output by said sample clock recoverer; and
        (iv) said estimator determining a frequency coefficient and a delay coefficient, said estimator settling the frequency coefficient and the delay coefficient, said estimator tracking and adjusting the frequency coefficient.

2. The audio system of claim 1 wherein the estimator measures the timing relationship between an internal counter of an audio subsystem processor and a time synchronization function.

3. The audio system of claim 2 wherein the estimator measures the timing relationship between the internal counter and the time synchronization function by multiplying the internal counter by the frequency coefficient then adding the delay coefficient to the result.

4. The audio system of claim 1 wherein the estimator adjusts the frequency coefficient and the delay coefficient.

5. The audio system of claim 4 wherein the estimator performs a delta ratio calculation on the time synchronization function and the internal counter and adaptively filters the result.

6. The audio system of claim 5 further comprising multiplying the output of the adaptive filter by the internal counter, then subtracting the result by the time synchronization function, then passing the result of the subtraction through an adaptive filter.

7. The audio system of claim 1 wherein the estimator tracks changes to the frequency coefficient and adjusts the frequency coefficient to eliminate frequency error.

8. The audio system of claim 1 wherein the estimator multiplies the internal counter by the frequency coefficient, adds the delay coefficient to the result of the multiplication, subtracts the time synchronization function from the result of the addition, divides the result of the subtraction by the internal counter, performs an AEC limiting function on the result of the division, adds the frequency coefficient to the result of the AEC limiting function, then stores the result of that addition as the frequency coefficient.

9. An audio system comprising:
    (a) a first listener including:
        (i) a wall clock maintaining a wall time for occurrence of an event, said wall time updated by a data transmitted by a master clock and received by said first listener;
        (ii) a frequency filter bandlimiting said updating data received from said master clock and said wall time, wherein said frequency filter comprises an estimator connected to receive said updating data by said sample clock recoverer; and
        (iii) said estimator determining a frequency coefficient and a delay coefficient, said estimator settling the frequency coefficient and the delay coefficient, said estimator tracking and adjusting the frequency coefficient; and (audio echo cancellation function)
        (iv) a sample clock recoverer retrieving a sample clock from data received by said first listener from a talker, said sample clock regulating a processing rate for a datum included in said data received from said talker.

10. The audio system of claim 9 wherein the estimator measures the timing relationship between an internal counter of an audio subsystem processor and a time synchronization function.

11. The audio system of claim 10 wherein the estimator measures the timing relationship between the internal counter and the time synchronization function by multiplying the internal counter by the frequency coefficient then adding the delay coefficient to the result.

12. The audio system of claim 9 wherein the estimator adjusts the frequency coefficient and the delay coefficient.

13. The audio system of claim 12 wherein the estimator performs a delta ratio calculation on the time synchronization function and the internal counter and adaptively filters the result.

14. The audio system of claim 13 further comprising multiplying the output of the adaptive filter by the internal counter, then subtracting the result by the time synchronization function, then passing the result of the subtraction through an adaptive filter.

15. The audio system of claim 9 wherein the estimator tracks changes to the frequency coefficient and adjusts the frequency coefficient to eliminate frequency error.

16. The audio system of claim 9 wherein the estimator multiplies the internal counter by the frequency coefficient, adds the delay coefficient to the result of the multiplication, subtracts the time synchronization function from the result of the addition, divides the result of the subtraction by the internal counter, performs an AEC limiting function on the result of the division, adds the frequency coefficient to the result of the AEC limiting function, then stores the result of that addition as the frequency coefficient.

17. A method for canceling audio echo in a network comprising the steps of:
    (a) generating a filtered time synchronization function for the network; and
    (b) settling a frequency coefficient and a delay coefficient for the network; and
    (c) tracking the frequency coefficient and adjusting the frequency coefficient to compensate for drift within the network.

18. A method for canceling audio echo in a network comprising the steps of:
    (a) measuring the timing relationship between an internal counter of an audio subsystem processor and a time synchronization function; and
    (b) settling a frequency coefficient and a delay coefficient for the network; and
    (c) tracking the frequency coefficient and adjusting the frequency coefficient to compensate for drift within the network.

19. A method for canceling audio echo in a network comprising the steps of:

(a) measuring a timing relationship between an internal counter of an audio subsystem processor and a time synchronization function; and (b) settling a frequency coefficient and a delay coefficient for the network; and (c) tracking the frequency coefficient and adjusting the frequency coefficient to compensate for drift within the network while constraining a frequency slew rate to be under an AEC limit.

20. A method for canceling audio echo in a network comprising the steps of:

(a) generating a filtered time synchronization function for the network; and (b) performing a delta ratio calculation on the time synchronization function and an audio network internal counter, adaptively filtering the result of the delta ratio calculation, multiplying the output of the adaptive filtering by the internal counter, then subtracting the result of the multiplication by the time synchronization function, then adaptively filtering the result of the subtraction; and (c) tracking the frequency coefficient and adjusting the frequency coefficient to compensate for drift within the network.

21. A method for canceling audio echo in a network comprising the steps of:

(a) generating a filtered time synchronization function for the network; and (b) settling a frequency coefficient and a delay coefficient for the network; and (c) multiplying an internal counter by the frequency coefficient, adding the delay coefficient to the result of the multiplication, subtracting the time synchronization function from the result of the addition, dividing the result of the subtraction by the internal counter, performing an AEC limiting function on the result of the division, adding the frequency coefficient to the result of the AEC limiting function, then storing the result of that addition as the frequency coefficient.

22. A method for reducing frequency error to zero in an audio network comprising the steps of:

(a) tracking a frequency coefficient and adjusting the frequency coefficient to compensate for drift; and (b) determining a filtered time synchronization function for the audio network; and (c) reducing jitter in the audio network by settling the frequency coefficient and the delay coefficient of the audio network.

23. The method of claim 21 wherein the jitter reduction is performed by using N number of frequency samples to settle the frequency coefficient and the delay coefficient.

24. The method of claim 22 wherein N is 1024.

25. A method for seeding a delay coefficient and a frequency coefficient in an audio system to cancel audio echo comprising the steps of:

(a) determining a filtered time synchronization function by obtaining the frequency coefficient and the delay coefficient and measuring the coefficients against an internal counter; and (b) processing and outputting the frequency coefficient and delay coefficient until a transient response of N filter length has settled; and (c) adjusting the frequency coefficient to compensate for frequency drift.

26. The method of claim 24 wherein the frequency coefficient and the delay coefficient were obtained at the same time.

27. The method of claim 24 wherein the N filter length is a length sufficient to meet a preferred jitter reduction.

28. The method of claim 26 wherein the preferred jitter reduction is 32.

29. The method of claim 24 further comprising adjusting the frequency coefficient to compensate for changes in the oscillator of a Wi-Fi radio subsystem.

* * * * *